United States Patent [19]

Kato et al.

[11] Patent Number: 4,638,350

[45] Date of Patent: Jan. 20, 1987

[54] COLOR IMAGE SENSING DEVICE

[75] Inventors: Tokuzo Kato, Chiba; Tsutomu Takayama; Toshio Kaji, both of Kanagawa, Japan

[73] Assignee: Canon Kabushiki Kaisha, Tokyo, Japan

[21] Appl. No.: 547,877

[22] Filed: Nov. 2, 1983

[30] Foreign Application Priority Data

Nov. 2, 1982 [JP] Japan ................................ 57-193090

[51] Int. Cl.[4] ........................ H04N 9/64; H04N 5/238

[52] U.S. Cl. ........................................ 358/29; 358/228

[58] Field of Search ............................ 358/29, 228, 10

[56] References Cited

U.S. PATENT DOCUMENTS 4,050,085 9/1977 Prince et al. .................... 358/228 X
4,064,529 12/1977 Seer, Jr. ................................ 358/29
4,219,841 8/1980 Nishimura et al. .................. 358/29
4,368,482 1/1983 Machida et al. ...................... 358/29
4,516,172 5/1985 Miyata et al. ....................... 358/228
4,527,189 7/1985 Ooi et al. .............................. 358/29

FOREIGN PATENT DOCUMENTS 0126425 10/1979 Japan .................................. 358/228

*Primary Examiner*—Michael A. Masinick
*Assistant Examiner*—Michael P. Dunnam
*Attorney, Agent, or Firm*—Toren, McGeady and Goldberg

[57] ABSTRACT

The disclosed image sensing device includes a sensing arrangement for converting an optical image into an electrical signal; an iris for adjusting the quantity of light supplied to the image sensing arrangement; gain control circuits for adjusting amplification gains of monochrome or color difference signals obtained from the image sensing arrangement; a peak detecting arrangement for detecting the peak values of the monochrome or color difference signals; a balance control for controlling the gain control circuits for white balance adjustment according to the signals obtained from the peak detecting arrangement; and an iris control for controlling the iris such that the output of the image sensing arrangement becomes lower when the gain control circuits are under the control of the balance control than when they are under a normal photographic condition.

17 Claims, 4 Drawing Figures

CHROMINANCE SIGNAL SEPARATION
GAIN CONTROL
GAIN CONTROL
PROCESS
PROCESS
PROCESS
MATRIX
ENCODER
Y
R-Y
B-Y
R
G
B
PEAK DETECTION
PEAK DETECTION
PEAK DETECTION
COMPARATOR
COMPARATOR
VOLTAGE STORING
VOLTAGE STORING
AVERAGE DETECTION
PEAK DETECTION
COMPARATOR
REFERENCE VOLTAGE GENERATION
A
B
1
2
3
4
5
6
7
8
9
10
11
15
16
17
18
19
20
21
22
23
24
25
26
27
28
29
200
201

CHROMINANCE SIGNAL SEPARATION
GAIN CONTROL
GAIN CONTROL
PROCESS
PROCESS
PROCESS
MATRIX
ENCODER
Y
R-Y
B-Y
R
G
B
PEAK DETECTION
PEAK DETECTION
COMPARATOR
COMPARATOR
REFERENCE VOLTAGE GENERATION
VOLTAGE STORING
VOLTAGE STORING
AVERAGE DETECTION
DC AMPLIFICATION
COMPARATOR
REFERENCE VOLTAGE GENERATION
A
B
1
2
3
4
5
6
7
8
9
10
11
17
18
19
20
21
28
29
30
31
32
33
34
35
36
37
300
301

ENCODER
MATRIX
PROCESS
GAIN CONTROL
CHROMINANCE SIGNAL SEPARATION
PEAK DETECTION
COMPARATOR
REFERENCE VOLTAGE GENERATION
VOLTAGE STORING
AVERAGE DETECTION
Y
R-Y
B-Y
R
G
B
1
2
3
4
5
6
7
8
9
10
17
18
19
20
21
28
29
30
31
32
33
34
35
300
400
401

COLOR IMAGE SENSING DEVICE

BACKGROUND OF THE INVENTION

1. Field of the Invention

This invention relates to a color image sensing device and more particularly to an image sensing device which is capable of automatically carrying out white balance adjustments.

2. Description of the Prior Art

A color image sensing device loses white balance when the color temperature of the light source varies. To overcome this problem, the image of a white or colorless photographic image is first sensed and, for example, a red color signal (R), a green color signal (G) and a blue color signal (B) which are obtained are adjusted to equal ratios. This process is called white balance adjustment. Generally, the white balance adjustment is accomplished by adjusting amplification gains of at least two or three different kinds of monochrome signals or two kinds of color difference signals obtained from the three kinds of monochrome signals. Since it is troublesome for users to carry out this adjustment manually, proposals have been made for various types of image sensing devices which are arranged to automatically accomplish the white balance adjustment.

An example of a prior art color image sensing device having an automatic white balance adjusting function is shown in FIG. 1 of the accompanying drawings. In FIG. 1, the prior art device includes an optical system 1; an image sensor 2 which recieves light passing through the optical system 1, senses the image of an object to be photographed which is formed thereon, and converts it to an electrical signal; and a chrominance signal separation circuit 3 which divides the electrical signal obtained from the image sensor 2 into three monochrome signals R, G and B. The monochrome signals R and B are respectively supplied to process circuits 6 and 8 via gain control circuits 4 and 5. The monochrome signal G is supplied directly to a process circuit 7. At the process circuits 6, 7 and 8, the signals R, G and B are subjected to gamma correction, aperture equalization and clamping processes as necessary. After these process circuits 6, 7 and 8, the respective signals R, G and B are supplied to a matrix circuit 9. The signals R, G and B are matrix processed to obtain a luminance signal (hereinafter called signal Y), a color difference signal R-Y and another color difference signal B-Y. The signals Y, R-Y and B-Y are processed at an encoder circuit 10 into a television signal. The television signal is produced from an output terminal 11.

The white balance adjustment is accomplished in the following manner: A perfectly white or colorless object is photographed. Then, the signals R, G and B thus obtained are supplied via the process circuits 6, 7 an 8 respective to average detection circuits 12, 13 and 14. The average detection circuits 12, 13 and 14 then perform integral detection and produce outputs corresponding to the respective intensities of these monochrome signals. The outputs of the average detection circuits 12 and 13 are compared with each other at a comparator 15. The comparator 15 then produces an output which corresponds to the difference in intensity between the monochrome signals R and G. If a switch 17 is on, the output of the comparator 15 controls a voltage storing circuit 19. For example, if the average value of the signal R is higher than that of the signal G, the voltage stored at the voltage storing circuit 19 is decreased to the gain control circuit lowers the amplification of the signal R.

This closed loop of a negative feedback circuit is formed while the switch 17 is on. The negative feedback loop becomes stable when the levels of the signals R and G are equalized. Upon stabilization of the negative feedback loop, the switch 17 is turned off. With the switch 17 turned off, a voltage which determines the amplification gain of the gain control circuit 4 required for the stabilization is stored at the voltage storing circuit 19. Thus, after the switch 17 is turned off the amplification gain of the gain control circuit 4 is fixed according to the voltage stored at the voltage storing circuit 19.

Another negative feedback loop which includes the gain control circuit 5 for the signal B operates in exactly the same manner. More specifically, the signal B which has undergone the processing of the process circuit 8 is supplied to an average detection circuit 14. A comparator 16 compares the intensity of the signal B with that of the signal G. Then, if the switch 18 is on, the feedback stabilizes the loop in the manner mentioned in the foregoing until the levels of the signals B and G are equalized. Upon completion of the control, the switch 18 is turned off. The amplification of the gain control circuit 5 is then controlled by the voltage stored at a voltage storing circuit 20. The levels of all the signals R, G and B can now be equalized by simultaneously turning on both the switches 17 and 18. With white balance adjustment accomplished in this manner, the voltages which determine the amplification gains of the gain control circuits 4 and 5 at that instant are stored at the voltage storing circuits 19 and 20. After that, for an ordinary photographic operation, the amplification gains of the gain control circuits 4 and 5 are controlled with the voltages stored at the voltage storing circuits 19 and 20, to permit photography under a satisfactory white balance condition. The length of time required for keeping the switches 17 and 18 on for carrying out the white balance adjustment must be arranged to be at least a period of time required for one field portion of a picture signal.

In the aforementioned color image sensing device, use of a white or colorless object is indispensable. For perfect white balance, the white or colorless object to be used must be such that it covers the whole image plane. In many cases however, such a large white or colorless object is not readily available.

A recently proposed image sensing device has a white and transmissive plate or the like inserted in a light path during white balance adjustment. This white balance adjusting arrangement obviates the need to use any white or colorless object to be photographed for that purpose. This method, however, requires an additional mechanical arrangement, which inevitably results in a more complex, larger device.

SUMMARY OF THE INVENTION

It is therefore an object of the present invention to provide a color image sensing device which, despite of its simple structural arrangement, is capable of automatically accomplishing white balance adjustment. It is another object of the invention to provide a color image sensing device which is capable of automatically accomplishing white balance adjustment with a simple electrical circuit added thereto and which obviates the necessity of use of a large white or colorless object for that purpose. To attain this object, a preferred embodiment of the invention is arranged to detect peak values of highly reliable monochrome signals obtained from an image sensor or those of color difference signals; and to accomplish the white balance adjustment according to the peak values detected. The embodiment is capable of accurately and automatically accomplishing white balance adjustment without necessitating any large white or colorless object or any additional mechanical arrangement for use of a white, transmissive diffusing plate.

Further, in accordance with the embodiment, in addition to the above-stated arrangement to adjust white balance using the peak values of the monochrome signals or color difference signals, there is provided a further arrangement whereby either the quantity of incident light is limited or the sensitivity of the device is reduced during the process of the white balance adjustment. This further arrangement prevents the peak values in the video signal from saturating to ensure highly reliable white balance control.

These and further objects and features of the invention will become apparent from the following detailed description of preferred embodiments thereof taken in conjunction with the accompanying drawings.

DETAILED DESCRIPTION OF THE PREFERRED EMBODIMENTS

Figure 1:
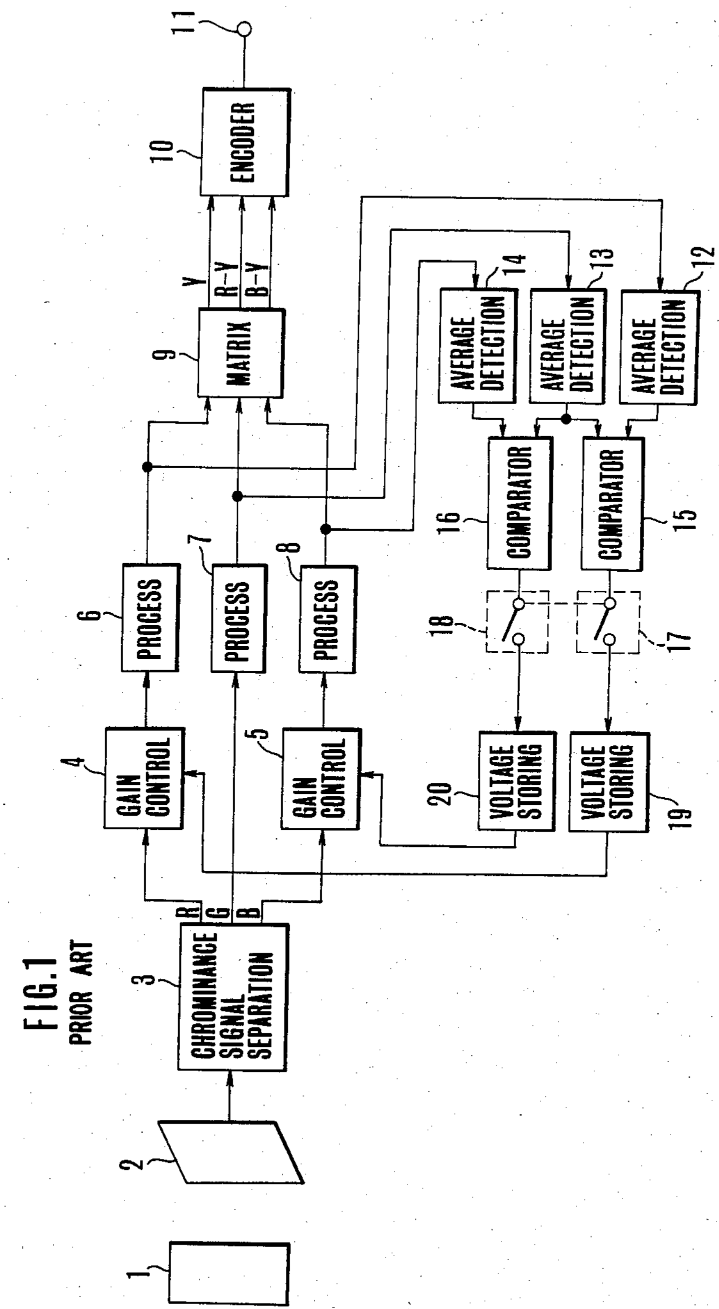
FIG. 1 is a block diagram showing an example of the conventional color image sensing devices.
Figure 2:
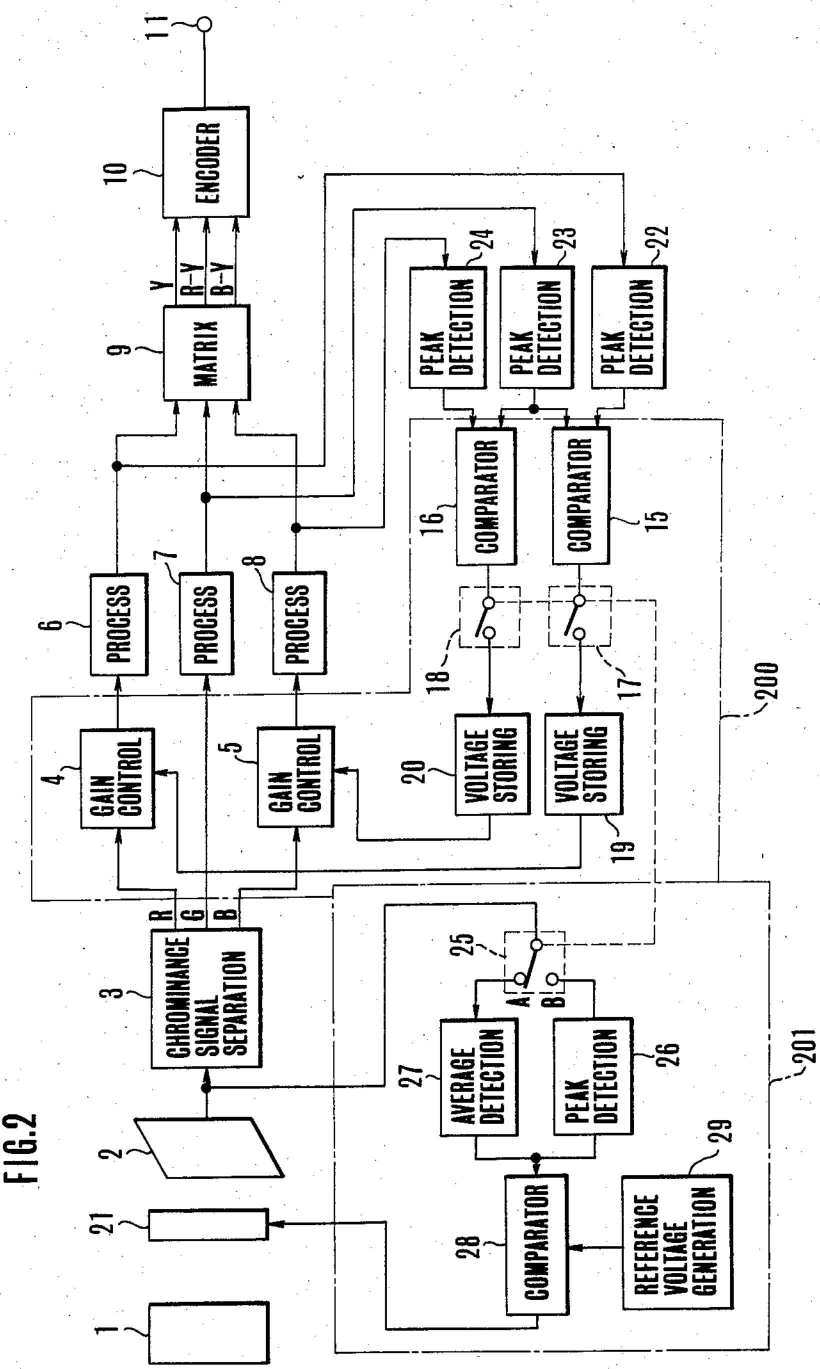
FIG. 2 is a block diagram showing a color image sensing device as a first embodiment example of the present invention.

In FIG. 2 which shows a color image sensing device as a first example of embodiment of the present invention, the components of the embodiment similar to the corresponding part of the color image sensing device of FIG. 1 are indicated by the same reference numerals. The embodiment is provided with peak detection circuits 22, 23 and 24 which are arranged to detect the peak values of the signals R, G and B after they have undergone, as color information components, the processes of the process circuits 6, 7 and 8.

Generally, the color of the brightest portion of a photographed picture is either white or close to white. Therefore, if a white balance adjustment is carried out with the color of the brightest portion considered to be white, the white balance adjustment can be proximately and satisfactorily accomplished for almost any picture-taking scene. In accordance with this concept, therefore the peak values of the signals R, G and B are detected by the peak detection circuits 22, 23 and 24 and are taken out therefrom in a holding manner. The outputs of the peak detection circuits 22, 23 and 24 are then supplied to a white balance control circuit 200 which is arranged to serve as balance control arrangement. Within this white balance control circuit 200, the outputs of the peak detection circuits 22 and 23 are supplied to a comparator 15 while the outputs of the peak detection circuits 23 and 24 are supplied to another comparator 16. The amplification gain of a gain control circuit 4 which also serves as a first gain control arrangement is adjusted on the basis of the error voltage produced from the comparator 15 while that of another gain control circuit 5 which serves as a first gain control means is adjusted on the basis of the error voltage produced from the comparator 16. The white balance adjustment is accomplished by adjusting these gains.

With the white balance adjustment carried out by detecting the peak values of the signals in this manner, there is the possibility that the peak value signals might saturate at the image sensor 2 or at the process circuits 6, 7 and 8, etc. The reliability of the peak value signals would be degraded by this possibility. To solve this problem, in this particular embodiment, the incident light quantity applied to the image sensor during the white balance adjustment is arranged to be less than the incident light quantity normally received by the image sensor. This arrangement is as follows:

For ordinary photography, the iris aperture of the embodiment is arranged to adjust to a suitable level an electrical signal which corresponds to the average value of the image of the object. For the white balance adjustment, however, the iris serves as attenuating means for reducing the incident light quantity to a smaller value than the value obtained for ordinary photography in such a way as to bring the signal which corresponds to the white signal of the object, i.e. the peak value signal, to a correct level.

The operation of the image sensing device of FIG. 2 for ordinary photography is as follows: An object image which comes via the optical system 1 and the iris 21 is converted into an electrical signal by the image sensor 2. At the chrominance signal separation circuit 3, signals R, G and B are taken out as color information components of the electrical signal. The signal R and B are supplied to the process circuits 6 and 8 via the gain control circuits 4 and 5 respectively. The signal G is directly supplied to the process circuit 7. The signals R, G and B are processed at the process circuits 6, 7 and 8 and are then supplied to the matrix circuit 9. At the matrix circuit, they are changed into signals Y, R-Y and B-Y. These signals Y, R-Y and B-Y are processed into a television signal at the encoder circuit 10 and the television signal is produced from the terminal 11.

Meanwhile, the signal produced by the image sensor 2 is arranged to be supplied also to an iris control circuit 201 which is arranged to control the aperture of the iris. Within this iris control circuit 201, the output signal of the image sensor 2 is supplied to an average detection circuit 27 via a switch 25. The switch 25 is arranged in association with the switches 17 and 18. The switching arrangement is such that, for ordinary photography, the switches 17 and 18 are both turned off while the switch 25 is connected to one side A thereof; and, for white balance adjustment, the switches 17 and 18 are both turned on while the switch 25 is connected to other side B as shown in FIG. 2. The output of the average detection circuit 27 is supplied to a comparator 28 and is compared with a reference voltage supplied from a reference voltage generating circuit 29 to the comparator 28. As a result of the comparison, the comparator 28 produces an error signal. The iris 21 is then adjusted such as to have the average value obtained at the average detection circuit 27 at a correct level.

The amplification gains of the gain control circuits 4 and 5 are stored respectively at the voltage storing circuits 19 and 20. The amplification gains are arranged to be determined by a control voltage obtained in a manner which is described later herein.

The white balance adjusting operation of the embodiment shown in FIG. 2 is as follows: The signals R, G and B are supplied to the peak detection circuits 22, 23 and 24 after they have been processed by the process circuits 6, 7 and 8. The peak detection circuits 22, 23 and 24 hold the peak values of the input signals and further perform a smoothing process, etc. before they produce outputs which are in proportion to the peak values of the signals R, G and B. The outputs of the peak detection circuits 22 and 23 are supplied to the comparator 15. The outputs of the peak detection circuits 23 and 24 are supplied to the other comparator 16. When the switches 17 and 18 turn on at this time, voltages stored at the voltage storing circuits 19 and 20 are adjusted until the error voltages produced from the comparators 15 and 16 disappear, so that the peak values of the signals R and G obtained via the gain control circuits 4 and 5 can be adjusted to equal levels.

However, as has been mentioned in the foregoing, the peak value signals obtained in this manner are not sufficiently reliable because of the possibility that they might become saturated while they are passing through the image sensor 2, the process circuits 6, 7 and 8, etc. In view of this, the embodiment is provided with a mechanism which is not shown but is arranged to shift the position of the switch 25 from the side A to the other side B when the switches 17 and 18 turn on. with the switch 25 shifted to the side B, the electrical signal obtained from the image sensor 2 is supplied to the peak detection circuit 26. Then, a voltage obtained from this peak detection circuit 26 is compared with a reference voltage at the comparator 28. As a result of this comparison, the comparator 28 produces an error voltage. The iris then serves to limit the quantity of incident light to bring the peak value signals to a correct level according to the error voltage. Limiting the incident light quantity in this manner attenuates the level of signals to be supplied to the peak detection circuits 22 and 23.

White balance adjustment is carried out using the peak value signals which are thus arranged to be at a correct and reliable level. Upon completion of the white balance adjustment, the switches 17 and 18 are turned off and, at the same time, the switch 25 is again connected to the side A. This restores the iris 21 in a normal position to be adjustable in accordance with the output of the average detection circuit 27. The incident light quantity again becomes a value suited for ordinary photographing. Further, the voltages of the voltage storing circuits 19 and 20 obtained at the termination of the white balance adjustment are stored and serve as control voltages to determine the amplification gain of the gain control circuits 4 and 5 as mentioned in the foregoing.

In accordance with the above-stated arrangement of the embodiment shown in FIG. 2, the peak values are assumed to be representing a white signal and white balance adjustment is arranged to be automatically carried out by detecting the peak values. Therefore, in so far as an image-sensing picture includes even a very little white portion, white balance adjustment can be automatically accomplished without having recourse to the conventional method of using a white or colorless object for covering the whole image-sensing picture plane. Another feature of the embodiment resides in that: The iris aperture control which heretofore has been accomplished for ordinary photography by detecting average values is arranged to be accomplished by detecting peak values. This arrangement enhances the reliability of the peak values used for white balance adjustment.

Figure 3:
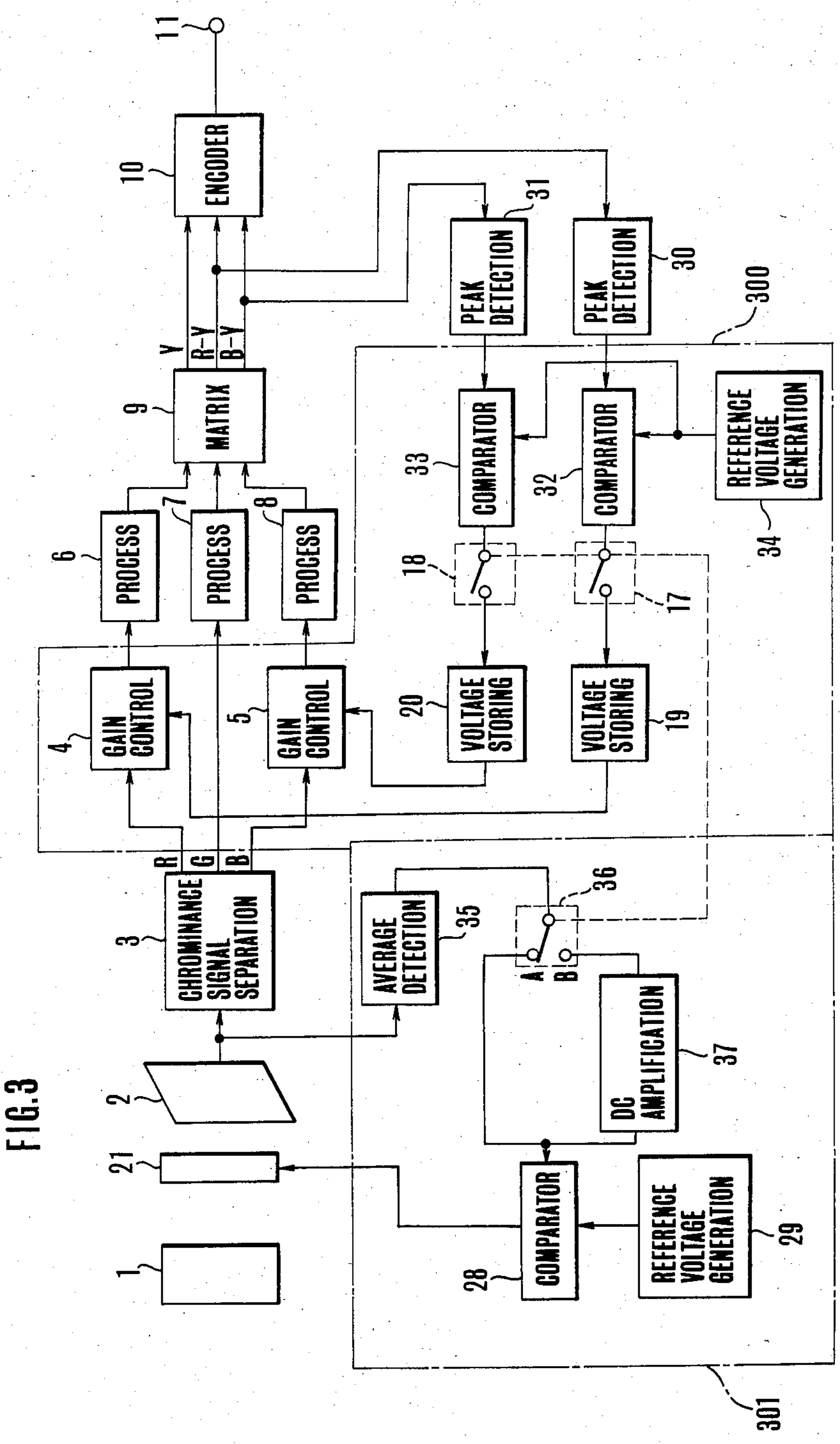
FIG. 3 is a block diagram showing a color image sensing device as a second embodiment example of the invention.

FIG. 3 shows a color image sensing device as a second embodiment of the present invention. In FIG. 3, the component elements of the second embodiment similar to those shown in FIG. 2 are indicated by the same reference numerals.

The ordinary photography or image-sensing operation of the second embodiment is as follows: The electrical signal representing an object image obtained from the image sensor 2 is arranged to be formed into a television signal by the encoder circuit 10 and is produced from the terminal 11. The switches 17 and 18 are off. The amplification gains of the gain control circuits 4 and 5 which serve as first gain control means are controlled by control voltages stored at the voltage storing circuits 19 and 20 in a manner to be described.

Under this condition, the iris 21 which is arranged as stopping-down means is controlled as follows: The output of the image sensor 2 is guided to an aperture control circuit 301 which is arranged to control the iris 21. The circuit 301 includes a switch 36 which is arranged in association with the switches 17 and 18 and is connected to one side A thereof when the switches 17 and 18 are off. Therefore, the electrical signal obtained from the image sensor 2 is supplied to an average detection circuit 35. The output of the average detection circuit 35 is supplied via the switch 36 directly to a comparator 28. At the comparator 28, the output of the average detection circuit 35 is compared with a reference voltage obtained from a reference voltage generator 29. As a result of this comparison, the comparator 28 produces an error signal. The iris 21 is adjusted according to the error signal in such a way as to bring the average value obtained at the average detection circuit 35 to a correct level. In this embodiment, peak detection circuits 30 and 31 which serve as peak detecting means are arranged to detect color difference signals B-Y and R-Y and thus to give the peak values of the color difference signals B-Y and R-Y. The detection outputs thus obtained are supplied to a white balance control circuit 300 which is arranged to serve as white balance control means. In the white balance control circuit 300, the outputs of the peak detection circuits 30 and 31 are respectively supplied to comparators 32 and 33 and are compared with a reference voltage produced from a reference voltage generating circuit 34. The comparators 32 and 33 then produce comparison output signals that make the outputs of the peak detection circuits 30 and 31 zero. These comparison output signals are guided respectively via the switches 17 and 18 to voltage storing circuits 19 and 20 in the same manner as in the first embodiment example. The rest of the arrangement is similar to the first embodiment example and requires no further description.

The white balance adjusting operation of the second embodiment shown in FIG. 3 is as follows: The two kinds of color difference signals R-Y and B-Y which are obtained at the matrix circuit 9 as color information components are respectively supplied to the peak detection circuits 30 and 31. The peak values of the signals R-Y and B-Y obtained from the peak detection circuits 30 and 31 are compared by the comparators 32 and 33 respectively with the reference voltage obtained from the reference voltage generating circuit 34. The error voltages thus produced by the comparators 32 and 33 are supplied to the voltage storing circuits 19 and 20 to adjust the voltages stored at these circuits 19 and 20. The voltages stored by the voltage storing circuits 19 and 20 are arranged to control the amplification gains of the gain control circuits 4 and 5. When the level of the signal R-Y is lower than the reference voltage obtained from the reference voltage generating circuit 34, the stored voltage of the voltage storing circuit 19 is caused by the error voltage produced by the comparator 32 to adjust the amplification gain of the gain control circuit 4 to a large value. With the amplification gain of the gain control circuit 4 thus increased, the level of the signal R-Y increases while that of the signal B-Y decreases somewhat. If the level of the signal B-Y is lower than the reference voltage on the other hand, the level of the signal B-Y is increased through a similar process while that of the signal R-Y decreases somewhat. The levels of the signals R-Y and B-Y are thus controlled to become equal to the reference voltage produced from the reference voltage generating circuit 34.

During the process of white balance adjustment, the switch 36 is connected to the side B as shown in FIG. 3 in association with the switches 17 and 18. The signal of the image sensor 2 obtained from the average detection circuit 35 has its level increased by a DC amplifier 37 and is then supplied to the comparator 28. At the comparator 28, the output level of the DC amplifier 37 thus obtained is compared with the reference voltage produced by a reference voltage generator 29 in the same manner as in the ordinary image sensing operation. The iris 21 is then controlled by the output of the comparator 28. As mentioned in the foregoing, the probability of the peak values obtained via the image sensor 2 and the process circuits 6, 7 and 8 saturating at some of these parts lowers the reliability of these park values. Mere use of these peak values for white balance adjustment, therefore, would not permit accurate white balance adjustment. In view of this probability, during the process of the white balance adjustment, the level of the average value obtained at the average detection circuit 35 is increased about two times and the iris 21 which serves as attenuating means is adjusted in such a way as to make a correct level twice as high as the average value. With the iris adjusted in this manner, the inputs to the peak detection circuits 30 and 31 attenuate accordingly to minimize the possibility of saturation of the signals R-Y and B-Y, so that the reliability of the peak values used for white balance adjustment can be enhanced.

Upon completion of white balance adjustment, the switches 17 and 18 turn off. After that, the voltages stored by the voltage storing circuits 19 and 20 when the white balance adjustment has come to an end are used for controlling the amplification gains of the gain control circuits 4 and 5. Meanwhile, with the switches 17 and 18 turned off the switch 36 is shifted back to the side A for an ordinary operation.

Figure 4:
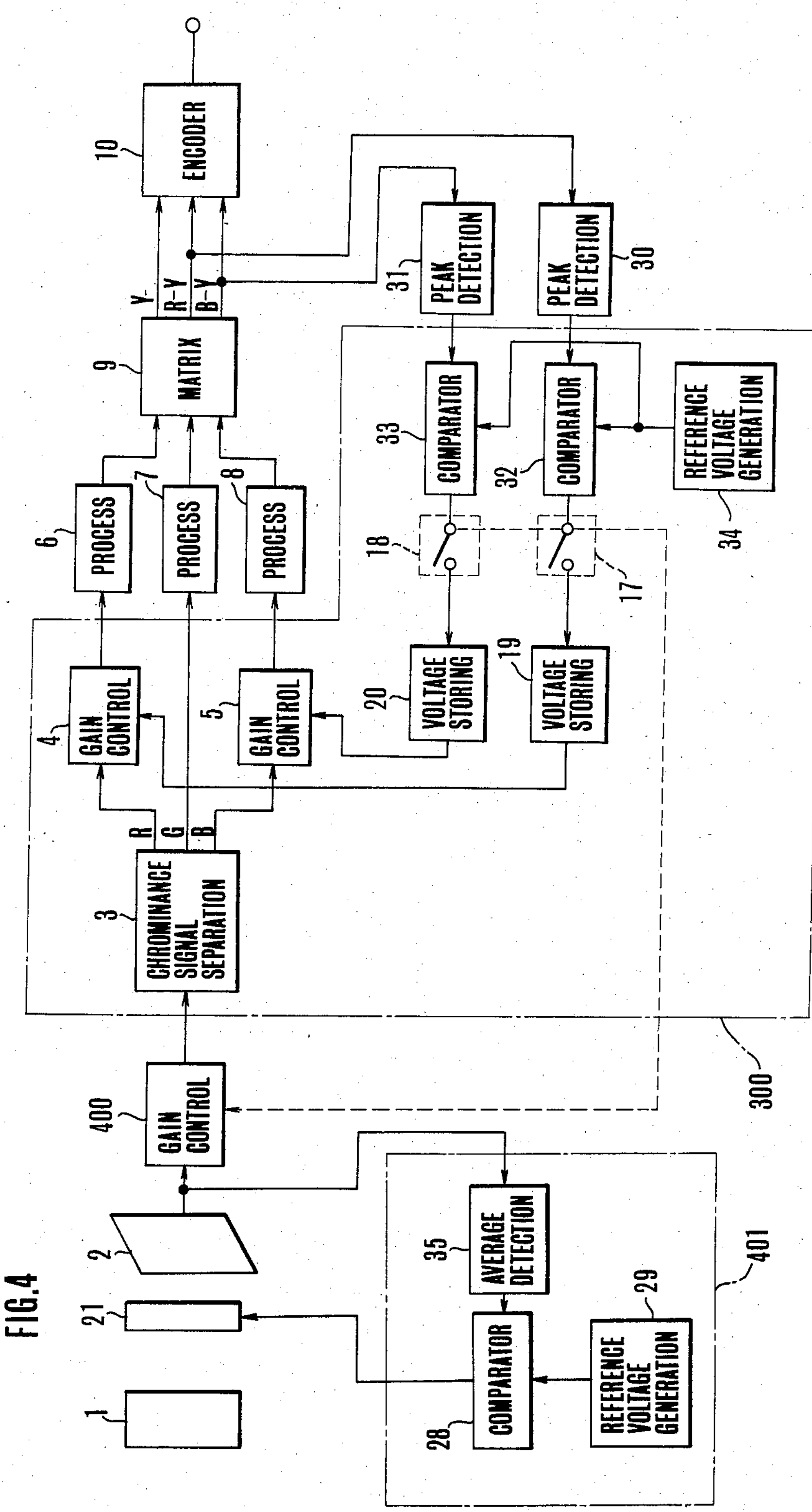
FIG. 4 is a block diagram showing another color image sensing device as a third embodiment example of the invention.

Referring now to FIG. 4 which shows a third embodiment of the invention, the same reference numerals as those used in FIG. 3 denote the same components. In the third embodiment, an aperture control circuit 401 which serves as iris controlling means is arranged to have the output of the image sensor 2 averaged by an average detection circuit 35; and to perform the control over the iris aperture by comparing the averaged output of the image sensor 2 at a comparator 28 with a reference voltage produced by a reference voltage generating circuit 29. The arrangement is such that the average level of the signal produced from the image sensor 2 is controlled to be always unvarying.

Further, in this embodiment a second gain control circuit 400 is provided, in a signal transmission line between the image sensor 2 and peak detection means. The gain of the gain control circuit 400 is arranged to decrease by, for example, 1 dB when the switches 17 and 18 turn on and to resume the original level when the switches 17 and 18 turn off.

Accordingly, while a white balance circuit 300 is performing a white balance control operation, the level of the signals supplied to the peak detection means is attenuated to prevent their peak values from saturating, so that white balance can be accurately carried out.

The color image sensing device which is arranged as shown in FIG. 4 is thus also capable of automatically carrying out highly reliable white balance adjustment in the same manner as in other devices shown in FIGS. 2 and 3.

The three embodiments described are arranged to adjust the amplification gains for the signals R and B. However, in accordance with the invention, white balance adjustment may be likewise accomplished by adjusting the amplification gains of any other parts. For example, white balance may be adjusted by controlling the amplification gains of all the signals R, G and B or those of any two of them.

Further, the three embodiment examples given in the foregoing are arranged to accomplish the white balance adjustment by a closed loop control. However, the invention is not limited to such closed loop arrangement. The white balance adjustment may be also accomplished by open loop control in accordance with the invention.

What we claim is:

1. A color image sensing device comprising:

(a) image sensing means for converting an optical image into an electrical signal output having a plurality of color information components;

(b) peak detecting means for detecting the peak values of the plurality of color information components included in the output of said image sensing means;

(c) balance control means for adjusting the balance of peak levels of a plurality of color signals included in the output of said image sensing means so as to be equal to each other;

(d) switch means for changing between a first mode in which the adjustment by said balance control means is permitted and a second mode in which the adjustment has ceased; and (e) attenuation control means for controlling the attenuation of the output level of said image sensing means according to whether said switch means is in the first mode or in the second mode, said attenuation control means first rendering the output level of said image sensing means smaller in the first mode than the output level of said image sensing means in the second mode.

2. A device according to claim 1, wherein said plurality of color information components included in the output of said image sensing means are signals representing respective predetermined colors.

3. A device according to claim 1, wherein said plurality of color information components included in the output of said image sensing means are color difference signals including predetermined color signals.

4. A device according to claim 1, wherein said peak detecting means includes a plurality of peak detection circuits.

5. A device according to claim 1, wherein said balance control means includes first gain control means for controlling the gain of predetermined color signals included in the output of said image sensing means.

6. A device according to claim 5, wherein said balance control means is arranged to control the gains of the predetermined color components such as to bring the peak values of the color information components obtained by said peak detecting means into a predetermined relation with each other.

7. A device according to claim 1, wherein said attenuation control means includes gain control means between said image sensing means and said peak detecting means.

8. A device according to claim 1, wherein said attenuation control means includes iris means for attenuating the quantity of light incident on said image sensing means.

9. A device according to claim 8, further including iris control means for causing said iris means to limit the quantity of light incident on said image sensing means in accordance with the level of the signal produced by said image sensing means.

10. A color image sensing device comprising:

(a) image sensing means for converting an optical image into an electrical signal output having a plurality of color information components;

(b) balance control means for adjusting the balance of levels of a plurality of color information components included in the output of said image sensing means;

(c) switch means for changing between a first mode in which adjustment by said balance control means is permitted and a second mode in which the adjustment has ceased; and (d) means for decreasing the amount of light incident on said image sensing means while the switch means is in the first mode, said means being arranged so as to make the amount of light incident on said image sensing means when said first switch means is in the first mode less than that when the first switch means is in the second mode.

11. A color image sensing device comprising:

(a) image sensing means for converting an optical image into an electrical signal output having a plurality of color information components;

(b) balance control means for adjusting the balance of levels of a plurality of color information components included in the output of said image sensing means;

(c) switch means for changing between a first mode in which adjustment by said balance control means is permitted and a second mode in which the adjustment has ceased; and (d) means for decreasing the output of said image sensing means while the switch means is in the first mode, said means being arranged so as to make the output of said image sensing means when said first switch means is in the first mode less than that when the first switch means is in the second mode.

12. A color balance control device comprising:

(a) image sensing means for converting an optical image into an electrical signal output having a plurality of color information components;

(b) white balance control means for adjusting a peak level of color information in the output of said image sensing means to a predetermined ratio, said control means having a first mode in which the adjustment is performed and a second mode in which the adjustment is suspended; and (c) level control means for making the first mode of said white balance control means correspond to a state in which the output signal of said image sensing means is relatively small and making the second mode of said white balance control means correspond to a state in which the input signal level to said white balance control means is relatively large.

13. A color balance control device according to claim 12, in which the level control means decreases the output signal level of said image sensing means in the first mode more than in the second mode.

14. A color balance control device according to claim 12, in which the level control means includes a gain control amplifier.

15. A color image sensing device comprising:

(a) image sensing means for converting an optical image into an electrical signal output having a plurality of color information components;

(b) peak detecting means for detecting the peak values of the plurality of color information components included in the output of said image sensing means;

(c) balance control means for adjusting the balance of peak levels of a plurality of color signals included in the output of said image sensing means so as to be equal to each other;

(d) switch means for changing between a first mode in which the adjustment by said balance control means is permitted and a second mode in which the adjustment has ceased; and (e) attenuation control means for controlling the attenuation of the output level of said image sensing means according to whether said switch means is in the first mode or in the second mode, said attenuation control means first rendering the output level of said image sensing means smaller in the first mode than the output level of said image sensing means in the second mode;

wherein said attenuation control means includes iris means for attenuating the quantity of light incident on said image sensing means, and further including iris control means for causing said iris means to limit the quantity of light incident on said image sensing means in accordance with the level of the signal produced by said image sensing means, and wherein said balance control means is actuable into and out of operation and said iris control means is arranged to control the iris means according to whether said balance control means is in operation.

16. A color image sensing device comprising:

(a) image sensing means for converting an optical image into an electrical signal output having a plurality of color information components;

(b) peak detecting means for detecting the peak values of the plurality of color information components included in the output of said image sensing means;

(c) balance control means for adjusting the balance of peak levels of a plurality of color signals included in the output of said image sensing means so as to be equal to each other;

(d) switch means for changing between a first mode in which the adjustment by said balance control means is permitted and a second mode in which the adjustment has ceased; and (e) attenuation control means for controlling the attenuation of the output level of said image sensing means according to whether said switch means is in the first mode or in the second mode, said attenuation control means first rendering the output level of said image sensing means smaller in the first mode than the output level of said image sensing means in the second mode;

wherein said attenuation control means includes iris means for attenuating the quantity of light incident on said image sensing means, and further including iris control means for causing said iris means to limit the quantity of light incident on said image sensing means in accordance with the level of the signal produced by said image sensing means, wherein said balance control means is actuable into and out of operation and said iris control means is arranged to control the iris means according to whether said balance control means is in operation, and wherein said iris control means controls said iris means on the basis of the average level of the signal proudced from said image sensing means when said balance control means is not actuated into operation and controls said iris means on the basis of the peak level of said signal produced from said image sensing means when said balance control means is actuated.

17. A color balance control device comprising:

(a) image sensing means for converting an optical image into an electrical signal output having a plurality of color information components;

(b) white balance control means for adjusting a peak level of color information in the output of said image sensing means to a predetermined ratio, said control means having a first mode in which the adjustment is performed and a second mode in which the adjustment is suspended; and (c) level control means for making the first mode of said white balance control means correspond to a state in which the output signal of said image sensing means is relatively small and making the second mode of said white balance control means correspond to a state in which the input signal level to said white balance control means is relatively large;

and wherein said level control means includes an exposure control member for changing the amount of light incident on said image sensing means.

* * * * *